Nov. 4, 1924.

W. H. BATEMAN 1,513,882

SEPARATOR EMPLOYED FOR THE SEPARATION OF LIQUIDS OF DIFFERENT DENSITY

Filed May 4, 1923

Inventor
W. H. Bateman
by
Attorney.

Inventor
W. H. Bateman
by
W. S. Evans
Attorney.

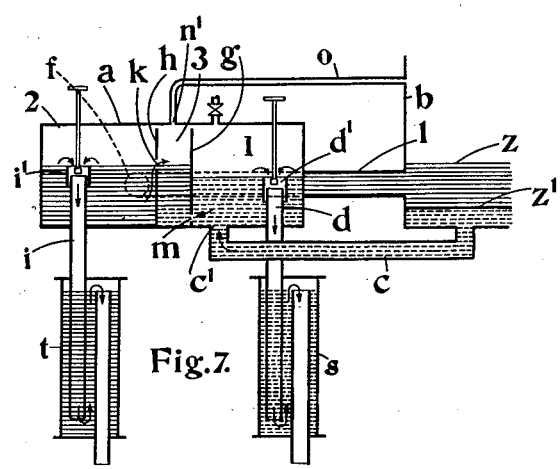

Patented Nov. 4, 1924.

1,513,882

UNITED STATES PATENT OFFICE.

WILLIAM HENRY BATEMAN, OF LONDON, ENGLAND.

SEPARATOR EMPLOYED FOR THE SEPARATION OF LIQUIDS OF DIFFERENT DENSITY.

Application filed May 4, 1923. Serial No. 636,709.

*To all whom it may concern:*

Be it known that I, WILLIAM HENRY BATEMAN, a subject of the King of Great Britain and Ireland, residing at 23 Great Winchester Street, London, E. C., England, have invented certain new and useful Improvements Relating to Separators Employed for the Separation of Liquids of Different Density, of which the following is a specification.

This invention relates to separators employed for the separation of liquids of different density and more especially for the separation of water from the condensate produced in the distillation of crude oil where the distillation is effected, as is usual, in the presence of steam, and where thus a considerable quantity of water is recovered with the condensate and requires separation therefrom.

The invention more especially relates to regulators of the kind described in the specification of my Patent No. 1,421,658 and has for its object to provide an improved construction of regulator which is applicable for use with any vessel, such as a separator or condenser, wherein various conditions of pressure or vacuum prevail under which the liquids admitted settle at different levels according to their respective volumes and densities.

Such a regulator comprises a casing divided into a number of compartments one of which is connected for the admission therein of the denser liquid and another for the admission of the less dense liquid, the said compartments communicating with a third so that the conditions as to levels of the liquids in the main vessel are thus reproduced therein, and this third compartment being provided with a sight glass or transparent cover plate so that the respective levels are visible. In the operation of the regulator the less dense liquid flows from its compartment over a weir to an outlet pipe while the denser liquid may overflow through a vertically disposed overflow outlet pipe mounted within the first compartment referred to. The weir thus provides the path for discharge of the less dense liquid, and the maximum height of the combined column is determined by the weir, while the height of the column of the denser liquid within the first compartment may be varied by suitable means, such as by an adjustable upper part or sleeve upon the overflow outlet pipe.

According to the present invention the regulator casing is a closed casing in which the several compartments are in communication for the equilization of pressure or vacuum therein while the conditions in respect to the flow of the liquids through the regulator are maintained, and means are provided whereby communication is established between the casing and the vapour or air space above the liquids in the main vessel, separator or condenser so that the conditions of pressure or vacuum existing in the main vessel, separator or condenser are reproduced in the regulator casing.

According to the invention the regulator casing is conveniently provided with a cover plate adapted to be fitted in position with a gas tight joint, and the partitions forming the compartments may be provided to permit communication at their upper ends. Communication between the casing and the air or vapour space of the main vessel, separator or condenser may be effected by a pipe, the outlet extremity of which opens into the upper part of one of the compartments of the casing. It is advantageous to provide the outlets for the liquids from the regulator casing in connection with liquid seals formed by U-shaped pipes, traps or other suitable arrangements making compensations for pressure variations. In order that the height of the overflow pipe for the denser liquid may be adjusted without removal of the cover plate of the casing, a key or handle may be provided to extend through a stuffing box or the like in the cover plate.

According to the invention, moreover, the outlet for the less dense liquid may be provided as an overflow outlet pipe similar to that serving for the denser liquid. The upper end of the said pipe may then serve as the weir by which the maximum height of the combined column of liquids in the separator or the like is determined. Means may be provided for adjusting the position of the upper end of the said pipe and thus varying the maximum height of the combined column of liquids.

The invention comprises the construction hereinafter described.

The invention is illustrated by way of example in the accompanying drawings.

Figure 7 is a diagrammatic arrangement illustrating the operation of the regulator.

Figure 1:
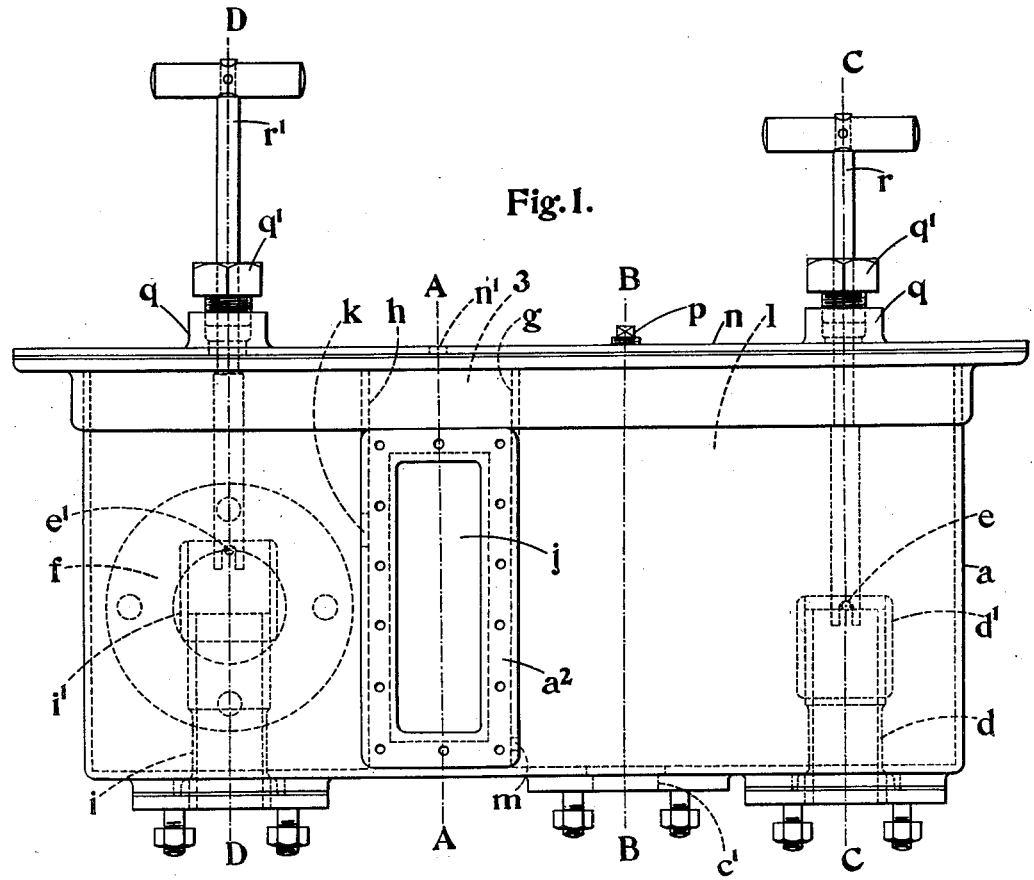
Figure 1 is a front elevation of a regulator constructed according to the invention.
Figure 2:
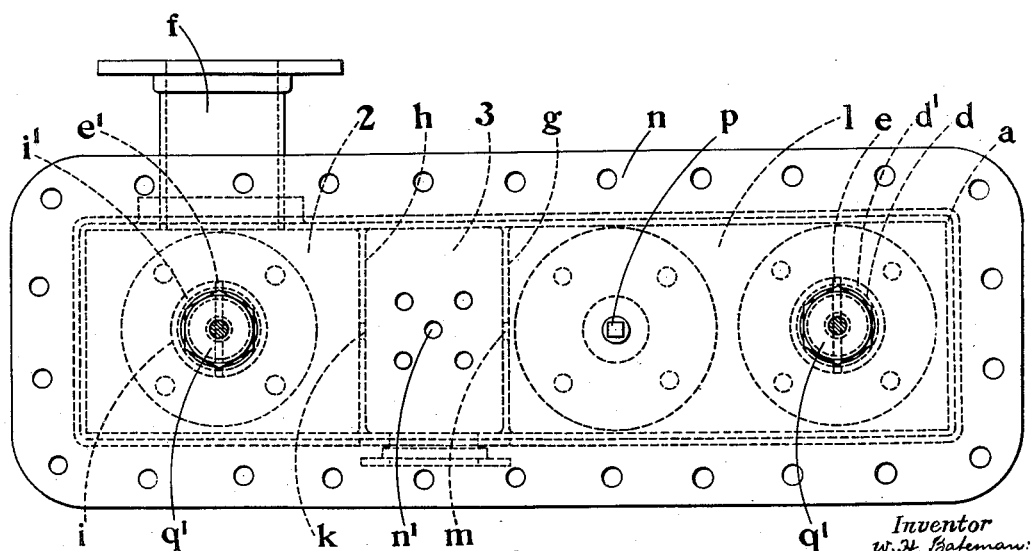
Figure 2 is a plan corresponding to Figure 1.
Figure 3:
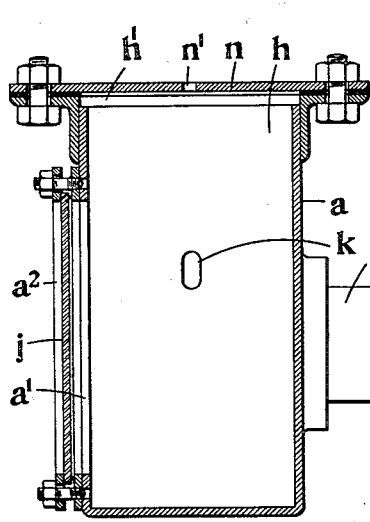
Figure 3 is a cross-sectional elevation on the line A—A Figure 1.
Figure 4:
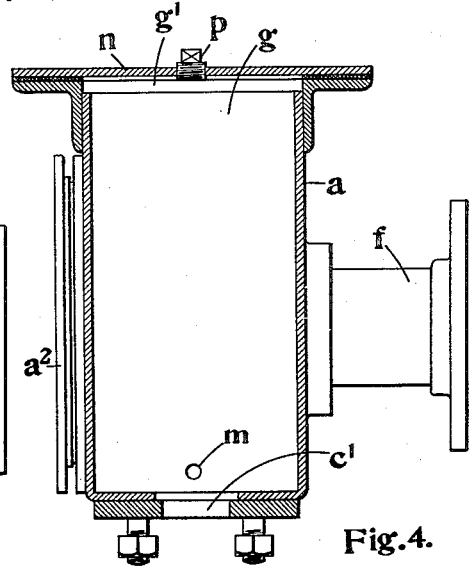
Figure 4 is a cross-sectional elevation on the line B—B Figure 1.
Figure 5:
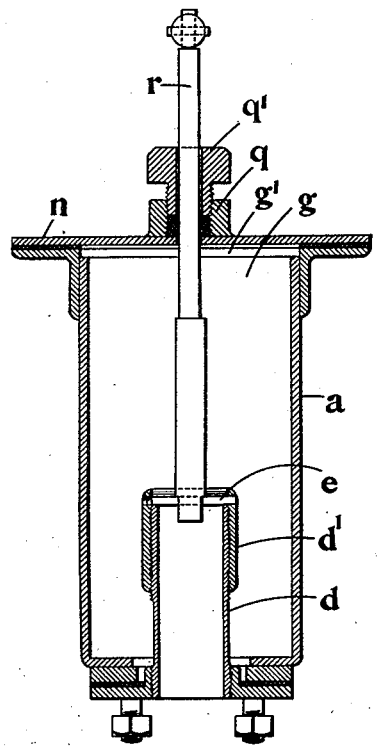
Figure 5 is a cross-sectional elevation on the line C—C Figure 1.
Figure 6:
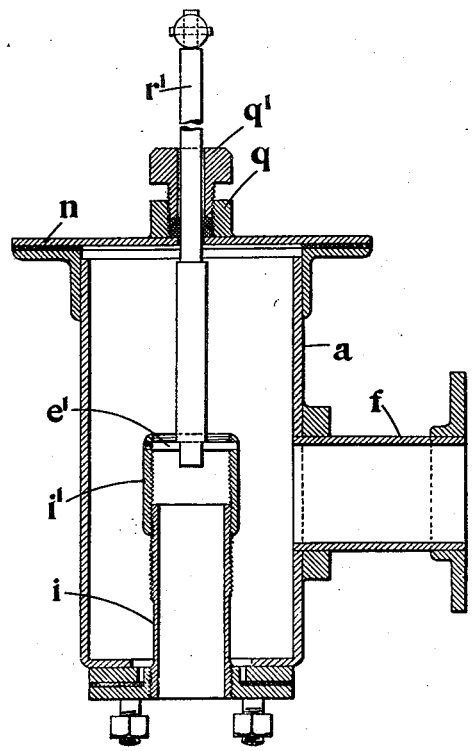
Figure 6 is a cross-sectional elevation on the line D—D Figure 1.

In carrying the invention into effect according to the construction of regulator as illustrated in the accompanying drawings, for use in separating water from oil, the regulator is provided as a casing $a$ which conveniently may take an oblong rectangular form, and is secured to the main vessel or condenser $b$ (Figure 7), so that the bottom of the casing $a$ of the regulator corresponds in position to the bottom of the main vessel or condenser $b$ wherein the oil level is indicated at $z$ and the water level $z^1$. The casing $a$ of the regulator is divided into three compartments by means of integral partitions $g$, $h$. At one end there is formed by the partition $g$, a compartment 1 for the denser liquid or water which flows into the compartment from the main vessel or condenser $b$ by way of a pipe $c$ connected with a water inlet opening $c^1$ leading into the compartment 1, so that the water thus passes from the condenser $b$ into this connecting pipe $c$ and rises into the water compartment 1 until equilibrium is established. The water outlet pipe $d$ is provided in this compartment as a vertical overflow pipe, being disposed in position adjacent the water inlet $c^1$; and the outlet pipe $d$ is provided with its upper part $d^1$ adjustable for the variation of the height of the column of water to maintain equilibrium. For this purpose the upper part $d^1$ of the outlet pipe is provided as a cylindrical sleeve having a screw threaded bore, and the upper end of the main part of the outlet pipe $d$ may be screw threaded on its exterior. At the upper end the movable part $d^1$ of the outlet pipe $d$ is conveniently provided with a cross bar $e$ by means of which it may be rotated for the purpose of adjusting the level of its upper edge, and thus of adjusting the level at which the water overflows, and is discharged from the compartment 1.

At the other end of the casing $a$ of the regulator there is formed by the partition $h$ a second compartment 2, serving to receive the less dense liquid or oil. A tubular connection $f$ is secured in proper position on the side of the casing, and serves for the admission of oil into the compartment 2 from the condenser $b$ by way of a connecting pipe $l$. An outlet pipe $i$ for the less dense liquid or oil is provided in the compartment 2 and is conveniently of similar construction to the outlet pipe $d$ of the compartment 1, that is to say, it comprises a vertical overflow pipe provided with the upper part $i^1$ adjustable for the variation of the height of the combined column of liquids in the condenser $b$. A cross bar $e^1$ is provided at the upper end of the adjustable part $i^1$ to permit the rotation of the latter to be effected. It will be understood that the less dense liquid or oil flows from the condenser $b$ by way of the pipe $l$ and connection $f$ into the compartment 2 of the casing whence it escapes by the overflow pipe $i$. Thus, the position of the adjustable part $i^1$ of the said pipe determines the height of the combined column of liquids in the condenser $b$.

A third compartment 3 is formed in the casing by the partitions $g$, $h$ between the compartment 1 and the compartment 2, which compartment serves for the reproduction therein of the levels of the liquids within the condenser $b$ in order that these may be under observation and control. For this purpose the partition $h$ between this compartment 3 and the compartment 2 has formed in it a communicating hole $k$ with its lower edge advantageously at a level slightly beneath that of the upper edge of the movable part $i^1$ of the pipe $i$ when adjusted in the lowest position for normal operation, while in the partition $g$ between the compartment 3 and the water compartment 1, a communicating hole $m$ is provided, near the bottom, so that thus oil and water flow into this compartment from the respective water and oil compartments 1, 2, and thus the respective levels of oil and water in the condenser $b$ are reproduced in the compartment 3, to correspond with those obtaining in the separator $b$. In order that these levels may be visible the front wall of the casing $a$ corresponding to the compartment 3 is formed with an aperture or window $a^1$ closed by a glass cover plate $j$ held in position by a retaining frame $a^2$ with suitable packing of asbestos cord or the like.

In order to permit the regulator to operate effectively under varying conditions as to pressure or vacuum in the main vessel or condenser, it is necessary that these conditions should be reproduced within the casing of the regulator. For this purpose, according to the invention the casing $a$ is completely closed by means of a cover plate $n$, the walls of the casing being advantageously extended upwardly and provided with a flange or seating for its reception. A layer of asbestos or like packing is advantageously used to ensure tightness of the joint. The cover plate is secured in position by means of bolts or other suitable securing devices. The partitions $g$ and $h$ are terminated short of the cover plate so that the compartments 1 and 2 may communicate with the compartments 3 by the spaces $g^1$ and $h^1$. An opening $n^1$ is formed in the cover plate $n$ and serves for the connection of the casing $a$ with the main vessel or condenser $b$ by way of a pipe $o$ which opens into the main vessel or condenser at a point above the level of the liquid in the latter and thus ensures that the conditions as to pressure or vacuum therein are reproduced in the casing $a$. An opening closed by a plug $p$ is advantageously provided in the cover plate above the compartment 1 to permit of the introduction therein of water to act as a seal. The cover plate is further provided with stuffing boxes $q$ and glands $q^1$ to permit keys or handles $r$, $r^1$ to be mounted in position for the operation, respectively, of the upper parts $d^1$, $i^1$ of the outlet pipes $d$, $i$, without removal of the cover plate. The lower extremities of the shanks of the keys or handles are suitably formed to engage the cross bars $e$, $e^1$.

As shown in Figure 7 it is advantageous to provide the water and oil outlets with liquid seals $s$ $t$ formed by means of traps, U-shaped pipes, or any other suitable devices.

The compartment 3 serving for the purpose of reproducing the levels of the respective liquids in the condenser or separator $b$ may be disposed in any other convenient relation than specifically hereinbefore described.

For a given maximum height of the combined column of the two liquids in the condenser $b$ as determined by the adjustment of the upper part $i^1$ of the overflow pipe $i$ any required relation in the volumes of the two liquids can be secured by the adjustment of the upper part $d^1$ of the overflow pipe $d$. When desirable, the condenser $b$ can be cleared entirely of the less dense liquid by lowering the upper part $i^1$ of the overflow pipe $i$ and raising the upper part $d^1$ of the overflow pipe $d$ to assure the relative adjustment necessary for the purpose.

I claim:

1. An outflow regulator for use with vessels adapted to contain liquids of different densities, comprising a closed casing, means for separately admitting the denser and less dense liquids into the said casing from the said vessel, means within the said casing to maintain therein columns of the liquids of determined height, outlets from the said casing for the discharge of the respective liquids, and means connecting the said casing with the vessel containing the liquids to equalize the pressure conditions in the said vessel and above the respective columns of liquids in the said casing.

2. An outflow regulator for use with vessels adapted to contain liquids of different densities, comprising a closed casing, means for separately admitting the denser and less dense liquids into the said casing from the said vessel, means within the said casing to maintain therein columns of the liquids of determined height, outlets from the said casing for the discharge of the respective liquids, and a conduit connecting the said casing with the liquid-containing vessel at a point above the surface of the liquids therein, the said conduit having an open outlet in the casing above the surface of the liquids therein.

3. An outflow regulator for use with vessels adapted to contain liquids of different densities, comprising a closed casing, compartments therein, means connecting said compartments with the vessel containing the liquids for the admission into the compartments respectively of the denser and less dense liquids, means within the said compartments to determine the height of the respective columns of liquid therein, outlets in the said compartments by which the overflow of the respective liquids may pass away, the said compartments being in communication for the equalization of the pressure conditions, and said casing being in communication with the space above the surface of the liquids in the vessel containing the said liquids.

4. An outflow regulator for use with vessels adapted to contain liquids of different densities, comprising a closed casing, means for separately admitting the denser and less dense liquids into the said casing from the said vessel, means within the said casing to maintain therein columns of the liquids of determined height, outlets from the said casing for the discharge of the respective liquids, means connecting the said casing with the vessel containing the liquids to equalize the pressure conditions in the said vessel and above the respective columns of liquids in the said casing, and means applied to the outlets from the said casing for the formation of liquid seals.

5. An outflow regulator for use with vessels adapted to contain liquids of different densities, comprising a casing, a cover plate for sealing said casing, partitions within said casing forming compartments therein, means connecting said compartments with the liquid-containing vessel for the admission into the compartments respectively of the denser and less dense liquids, an overflow outlet of adjustable height in the compartment for the denser liquid, an overflow outlet of adjustable height in the compartment for the less dense liquid, the said compartments being in communication with the space above the surface of the liquids in the liquid-containing vessel, and means for the adjustment of the overflow outlets operable from without the casing.

6. An outflow regulator for use with vessels adapted to contain liquids of different densities, comprising a closed casing, compartments within the said casing in which are maintained respectively columns of the liquids of determined height, said compartments being respectively in communication with the liquid-containing vessel for the admission of the denser and less dense liquids, an indicator compartment in the said casing communicating respectively at the lower end with the compartment containing the denser liquid and at the upper end with the compartment containing the less dense liquid, outlets from the said casing for the discharge of the respective liquids, and means connecting the said casing with the vessel containing the liquids to equalize the pressure conditions in the said vessel and above the respective columns of liquids in the said casing.

7. An outflow regulator for use with vessels adapted to contain liquids of different densities, comprising a casing, a cover plate for sealing said casing, a plurality of compartments therein, means connecting two of said compartments with the vessel containing the liquids for the admission into the said compartments respectively of the denser and less dense liquids, the said compartments being in communication with each other and with the space above the surface of the liquids in the vessel containing the said liquids for the equalization of the pressure conditions, an overflow outlet of adjustable height in the compartment for the denser liquid, an overflow outlet of adjustable height in the compartment for the less dense liquid, and a third compartment in the said casing communicating at the lower end with the compartment containing the denser liquid and towards the upper end with the compartment containing the less dense liquid for the reproduction in said compartment of the levels of liquid in the liquid containing vessel, and means to permit the levels of liquid in the said compartment to be observed.

WILLIAM HENRY BATEMAN.